(12) United States Patent
Paschal et al.

(10) Patent No.: US 9,702,323 B2
(45) Date of Patent: Jul. 11, 2017

(54) APPARATUS AND METHOD FOR PASSIVE CHARGE AIR CONDENSATE DRAIN WITH EXHAUST STACK VENT

(71) Applicant: GENERAL ELECTRIC COMPANY, Schenectady, NY (US)

(72) Inventors: Derek Paschal, Glen Ellyn, IL (US); Charles Bernard Atz, Grove City, PA (US); Vijayaselvan Jayakar, Bangalore (IN); Laus Lynd Deo, Bangalore (IN)

(73) Assignee: General Electric Company, Schenectady, NY (US)

(*) Notice: Subject to any disclaimer, the term of this patent is extended or adjusted under 35 U.S.C. 154(b) by 182 days.

(21) Appl. No.: 14/659,734

(22) Filed: Mar. 17, 2015

(65) Prior Publication Data

US 2016/0273496 A1    Sep. 22, 2016

(51) Int. Cl.
| | |
|---|---|
| *F02M 25/07* | (2006.01) |
| *F02M 26/35* | (2016.01) |
| *F02B 29/04* | (2006.01) |
| *F02M 26/22* | (2016.01) |
| *F02B 37/013* | (2006.01) |

(52) U.S. Cl.
CPC ......... *F02M 26/35* (2016.02); *F02B 29/0468* (2013.01); *F02M 26/22* (2016.02); *F02B 37/013* (2013.01)

(58) Field of Classification Search
CPC .... F02M 26/35; F02M 26/22; F02B 29/0468; F02B 37/013
USPC ................... 123/568.12, 542, 563
See application file for complete search history.

(56) References Cited

U.S. PATENT DOCUMENTS

| | | | |
|---|---|---|---|
| 5,611,204 A | 3/1997 | Radovanovic et al. | |
| 6,073,446 A | 6/2000 | Aeffner | |
| 7,131,263 B1* | 11/2006 | Styles | F02M 26/35 123/568.12 |
| 7,757,678 B2 | 7/2010 | Marsh et al. | |
| 8,104,456 B2* | 1/2012 | Yacoub | F02B 37/00 123/25 A |

(Continued)

FOREIGN PATENT DOCUMENTS

| | | |
|---|---|---|
| EP | 0935059 A2 | 8/1999 |
| JP | 2010043585 A | 2/2010 |

(Continued)

OTHER PUBLICATIONS

Eurasian Search Report and Opinion issued in connection with corresponding EA Application No. 201690379 on Jul. 6, 2016.

*Primary Examiner* — Hai Huynh
(74) *Attorney, Agent, or Firm* — Global Patent Operation; John A. Kramer

(57) ABSTRACT

A charge air cooling chamber has a lower wall with an orifice in the lower wall. A condensate pipe is fluidly connected to drain exhaust fume condensate from the orifice into a collection tank. A vent pipe is fluidly connected to vent fumes from an upper opening of the collection tank to an exhaust stack. A loop seal is fluidly connected to drain condensate from a lower opening of the collection tank. Exhaust gas moisture condensate drains from the cooling chamber into the collection tank, via the continuously open orifice. Exhaust gas moisture condensate fumes vent from the collection tank to the exhaust stack.

22 Claims, 2 Drawing Sheets

(56) References Cited

U.S. PATENT DOCUMENTS

Figure 1:
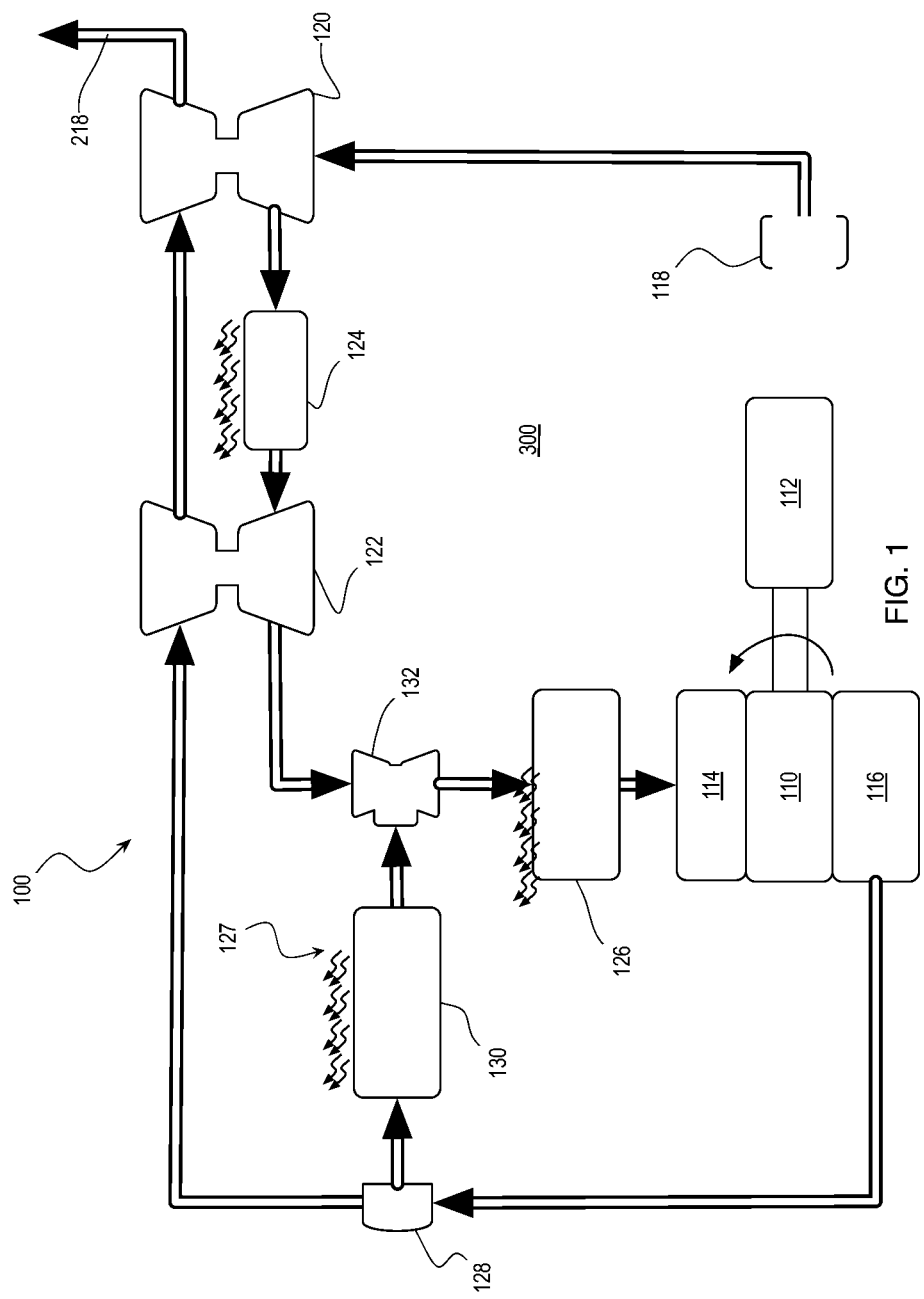

| | | | | |
|---|---|---|---|---|
| 8,191,366 B2* | 6/2012 | Taylor | ............... | F02B 29/0468 |
| | | | | 123/542 |
| 8,307,643 B2* | 11/2012 | Quinn | ............... | F02B 29/0468 |
| | | | | 123/563 |
| 9,010,112 B2* | 4/2015 | Palm | ............... | F02B 29/0468 |
| | | | | 60/599 |
| 9,027,341 B2* | 5/2015 | Meyer | ............... | F02B 29/0468 |
| | | | | 123/542 |
| 9,181,853 B2* | 11/2015 | Leone | ............... | F02B 29/0468 |
| 9,228,557 B1* | 1/2016 | Pursifull | ............... | F02N 19/02 |
| 9,546,590 B2* | 1/2017 | Radmard | ............ | F02B 29/0468 |
| 2008/0190079 A1* | 8/2008 | Cerdes | ............... | F02M 35/024 |
| | | | | 55/319 |
| 2009/0014161 A1 | 1/2009 | Mihajlovic | | |
| 2014/0014076 A1 | 1/2014 | Jayakar | | |
| 2014/0158096 A1 | 6/2014 | Leone et al. | | |

FOREIGN PATENT DOCUMENTS

| | | |
|---|---|---|
| RU | 2336422 C1 | 10/2008 |
| RU | 141531 U1 | 6/2014 |

* cited by examiner

APPARATUS AND METHOD FOR PASSIVE CHARGE AIR CONDENSATE DRAIN WITH EXHAUST STACK VENT

BACKGROUND

Technical Field

Embodiments of the invention relate generally to engine air systems. Particular embodiments relate to mitigating condensate collection within exhaust gas recirculating engine air systems.

Discussion of Art

In response to evolving emissions regulations (e.g., Tier 4 and IMO 3), engine manufacturers globally are investing in technologies such as two stage turbocharging, common rail fuel systems, exhaust gas recirculation ("EGR"), selective catalytic reduction ("SCR"), and exhaust gas after-treatment. For example, two stage turbocharging and EGR can be combined for enhanced fuel efficiency and exhaust cleanliness. But under certain ambient conditions, particularly in maritime environs, intake air moisture can condense during turbocharging. This condensate must be removed before reaching the intake manifold, in order to prevent corrosion and other engine damage. Also, when fuel containing sulfur (e.g., marine diesel oil) burns inside the engine combustion chamber, the combustion products include sulfur oxides. Exhaust gas containing sulfur oxides, when mixed with moist intake air via EGR, forms acidic vapors that can condense in the engine. Quantities of acidic condensate depend upon the sulfur content in the fuel as well as the engine operating conditions. Unless removed from the system, the condensed acidic medium will corrode at least the exhaust gas recirculation (EGR) cooler as well as the air intake manifold.

In view of the above, it may be desirable to provide apparatus and methods to passively drain condensate from the charge air system of a diesel engine with the condition that the charge air contains products of diesel combustion exhaust and cannot be vented directly to the local environment.

BRIEF DESCRIPTION

In an embodiment, an apparatus includes a charge air cooling chamber, a condensate pipe, a vent pipe, a collection tank, and a loop seal. The cooling chamber has a lower wall with an orifice in (i.e., opened through) the lower wall. The condensate pipe is fluidly connected to drain condensate (e.g., exhaust fume condensate) from the orifice into the collection tank. The vent pipe is fluidly connected to vent fumes from an upper opening of the collection tank to an exhaust stack. The loop seal is fluidly connected to drain the condensate from a lower opening of the collection tank. In another embodiment, the condensate pipe is fluidly connected to directly and continuously drain the condensate from the orifice into the collection tank.

In another embodiment, an apparatus includes an engine air intake plenum and an EGR valve connected to admit exhaust gas from an engine exhaust line into the engine air intake plenum. The apparatus further includes a cooling chamber fluidly coupled with the engine air intake plenum, and having an orifice in (i.e., opened through) a lower wall of the cooling chamber. The apparatus further includes a condensate pipe that is operatively connected to drain condensate from the orifice into a collection tank. For example, the condensate pipe may be configured, in conjunction with the orifice, to directly and continuously drain the condensate from the orifice into the collection tank. The apparatus further includes a vent pipe that is operatively connected to vent fumes from an upper opening of the collection tank to an engine exhaust stack, and a loop seal operatively connected to drain the condensate from a lower opening of the collection tank. The cooling chamber may be one of an intercooler chamber, an aftercooler chamber, or an EGR cooler chamber.

In another embodiment, a method includes draining condensate (e.g., exhaust gas moisture condensate) from a cooling chamber of an engine exhaust gas recirculation system, into a collection tank, via a continuously open orifice. The method further includes venting condensate fumes from the collection tank to an exhaust stack of the engine.

DRAWINGS

Figure 2:
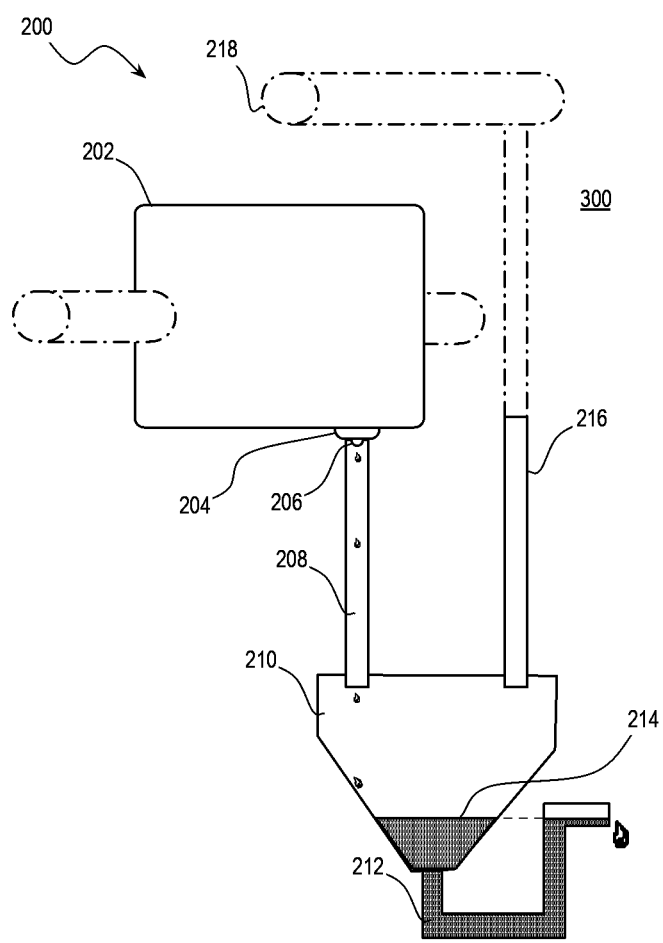

The present invention will be better understood from reading the following description of non-limiting embodiments, with reference to the attached drawings, wherein below:

FIG. 1 shows schematically a combustion engine according to embodiments of the invention; and FIG. 2 shows schematically a passive condensate drain system usable with the combustion engine of FIG. 1, according to embodiments of the invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to marine diesel engines, embodiments of the invention also are applicable for use, generally, with turbocharged engines that are configured for exhaust gas recirculation.

FIG. 1 shows schematically a combustion engine 100, e.g., a marine diesel engine, which may be located within an enclosed space 300, e.g., a marine vessel engine room. The engine 100 includes combustion cylinders 110, which are operatively connected to drive a transmission 112 for delivery of mechanical power to loads. The combustion cylinders 110 ingest air from an intake plenum 114, mix and combust fuel in the ingested air, and expel exhaust gas to an exhaust manifold 116. The air within the intake plenum 114 is drawn from an intake filter 118, which can be disposed either within or outside the enclosed space 300. For enhanced fuel efficiency, power delivery, etc., the air from the intake filter 118 is pressurized by respective compressor portions of a first turbocompressor 120 and a second turbocompressor 122. The turbocompressors 120, 122 are driven by exhaust gas that flows from the exhaust manifold 116 through an engine exhaust line to turbine portions of the turbocompressors and then from the turbocompressors to an exhaust stack 218 that vents outside of the enclosed space 300. For enhanced fuel efficiency, the pressurized intake air is cooled by water, air, or other coolant within an intercooler 124 (between the first and second turbocompressors 122, 124) and within an aftercooler 126 (between the second turbocompressor 124 and the intake plenum 114). For reduction of NOx emissions, a portion of the exhaust gas that otherwise would flow directly to the exhaust stack 218, instead is diverted by an exhaust gas recirculation ("EGR") system 127 that includes an EGR valve 128, in proportion according to engine operating conditions. The diverted exhaust gas then is fed back to the combustion cylinders 110 via an EGR cooler 130 and (in some embodiments) a venturi pump 132. Collectively, the intercooler 124, the aftercooler 126, and the EGR cooler 130 can be described as "charge air cooling chambers."

As discussed above, one problem of cooling pressurized exhaust gas is that moisture condenses out of the cooled gas along with particulates such as sulfur oxides. The resultant exhaust gas moisture condensate can be acidic, corrosive, and generally deleterious to engine operation and lifetime. For example, in the event that condensate collects on a surface of a charge air cooling chamber, the resultant corrosion can cause leakage from the chamber. In case the leakage includes exhaust gas fumes, this can render an enclosed space (such as a marine vessel engine room) unfit for occupancy. Therefore, it is desirable to avert collection of condensate within charge air cooling chambers.

Previous modes of draining condensate from charge air cooling chambers have typically made use of steam trap technologies, e.g., float valves or other level sensing valves, which drain directly to a bilge and maintain a small heel of condensate at the valve for vapor sealing (thereby preventing leakage of exhaust gas fumes into the enclosed space). However, in the context of corrosive exhaust gas moisture condensate, such technologies are problematic because the condensate heel will tend to damage the valve that is meant to maintain the heel.

Accordingly, an exemplary embodiment of the invention provides a valveless or passive condensate drain system or apparatus 200, as shown schematically in FIG. 2. The apparatus 200 connects from a charge air cooling chamber 202 to drain condensate through a loop seal gravity drain 212 and to vent fumes to the exhaust stack 218. (The charge air cooling chamber 202 may be any one or more of the intercooler 124, the aftercooler 126, and/or the EGR cooler 130 as shown in FIG. 1.) More particularly, the apparatus 200 may include a condensate collection volume 204 that is indented downward into a lower surface of the charge air cooling chamber 202. The apparatus 200 also includes an orifice 206 that is opened from the lower surface of the charge air cooling chamber 202 (e.g., from the condensate collection volume 204) directly into a condensate pipe 208. The condensate pipe 208 runs to a condensate collection tank 210. (For example, the condensate pipe may run directly to the tank 210, meaning no engine components are disposed between the orifice and the tank other than the pipe.) The condensate collection tank 210 has two outlets: the loop seal gravity drain 212, and a vent pipe 216. The loop seal 212 is fluidly connected to drain the condensate from a lower opening of the collection tank into the enclosed space 300, e.g., into a bilge funnel. The vent pipe 216 is fluidly connected to vent fumes from an upper opening of the collection tank into the exhaust stack 218.

During operation of the engine 100, the charge air cooling chamber 202 typically will be pressurized at a pressure greater than a pressure of the engine exhaust stack 218, e.g., at about 6 bar or above. The collection tank 210 will be pressurized at a pressure intermediate between the cooling chamber and the engine exhaust stack, e.g., above 1 bar, and the engine exhaust stack 218 may be at or slightly above atmospheric pressure. In particular, it is possible to connect the vent pipe 216 either upstream or downstream of a muffler and particulate filter, as any exhaust gas particulates that reach the collection tank 210 will be precipitated into the exhaust gas moisture condensate.

Thus, the condensate drain apparatus 200 allows a small amount of charge air that has already been mixed with exhaust fumes (e.g., no more than about 0.01% of the flow of charge air through the cooling chamber 202), to flow from the charge air cooling chamber 202 to the exhaust stack 218 via the orifice 206, the condensate pipe 208, the collection tank 210, and the vent pipe 216. Exhaust gas moisture condensate mixture that occurs naturally in the charge air system will accumulate in the condensate collection volume 204, then drip through the orifice 206 and down the condensate pipe 208 to the collection tank 210. As the condensate fills the tank 210, overflow will exit the tank via the loop seal 212. The loop seal 212 discharge is positioned to maintain a condensate mixture heel 214 within the tank 210, thereby sealing the exhaust fumes from the discharge of the loop seal. By providing a valveless system for draining condensate from the charge air cooling chamber 202, maintenance is reduced and reliability is improved.

Advantageously, the condensate drain apparatus 200 enables diesel engine charge air condensate to be safely removed from the charge air system without venting into the engine room exhaust gas that is present in the charge air. Venting of exhaust gas other than to the engine exhaust stack system is prohibited by various safety standards and local laws.

Thus, embodiments of the invention provide an apparatus that includes a charge air cooling chamber, the cooling chamber having a lower wall with an orifice opened through the lower wall; a condensate pipe that is fluidly connected to drain condensate (e.g., exhaust fume condensate) from the orifice into a collection tank (e.g., directly into the tank); a vent pipe that is fluidly connected to vent fumes from an upper opening of the collection tank to an exhaust stack; and a loop seal that is fluidly connected to drain the condensate from a lower opening of the collection tank. The cooling chamber may be one of an intercooler chamber, an aftercooler chamber, or an EGR cooler chamber in a diesel exhaust gas recirculation system that is connected between an exhaust line and an air intake plenum of a diesel engine. The cooling chamber may have a condensate collection volume indented downward into the lower wall, and the orifice may be opened from the condensate collection volume. During operation of the engine, the cooling chamber is pressurized at a pressure greater than a pressure of the exhaust stack, the collection tank is pressurized at a pressure intermediate between the cooling chamber and the exhaust stack, and the loop seal discharges to atmospheric pressure. For example, the cooling chamber may be pressurized to at least about 6 bar. The orifice may be sized to admit a gaseous flow of no more than about 0.01% of the flow through the cooling chamber. The loop seal discharge may be positioned to maintain a heel of condensate within the collection tank. The loop seal discharge may be positioned within an enclosed space, e.g., a marine vessel engine room.

Other embodiments provide an apparatus that includes an engine air intake plenum; an EGR valve connected to admit exhaust gas from an engine exhaust line into the engine air intake plenum; a cooling chamber fluidly coupled with the engine air intake plenum, and having an orifice opened through a lower wall of the cooling chamber; a condensate pipe operatively connected to drain condensate (e.g., directly and continuously) from the orifice into a collection tank; a vent pipe operatively connected to vent fumes from an upper opening of the collection tank to an engine exhaust stack; and a loop seal operatively connected to drain the condensate from a lower opening of the collection tank. The cooling chamber may be one of an intercooler chamber, an aftercooler chamber, or an EGR cooler chamber. The cooling chamber may have a condensate collection volume indented downward into the lower wall, and the orifice may be opened from the condensate collection volume. During operation of the engine, the cooling chamber is pressurized at a pressure greater than a pressure of the engine exhaust stack, the collection tank is pressurized at a pressure intermediate between the cooling chamber and the engine exhaust stack, and the loop seal discharges to atmospheric pressure. For example, the cooling chamber may be pressurized to at least about 6 bar. The orifice may be sized to admit a gaseous flow of no more than about 0.01% of the flow through the cooling chamber. The loop seal discharge may be positioned to maintain a heel of condensate within the collection tank. The loop seal discharge may be positioned within an enclosed space, e.g., a marine vessel engine room.

Other embodiments implement a method that includes draining condensate (e.g., exhaust gas moisture condensate) from a cooling chamber of an engine exhaust gas recirculation system, into a collection tank, via a continuously open orifice; and venting condensate fumes (e.g., exhaust gas moisture condensate fumes) from the collection tank to an exhaust stack of the engine. The method may also include maintaining a heel of the condensate within the collection tank; and draining the condensate from the collection tank via a loop seal in the event that the heel exceeds a level determined by the loop seal position. The loop seal may drain to atmosphere within an enclosed space. For example, the enclosed space may be a marine vessel engine room.

In another embodiment, a method comprises draining condensate from a charge air cooling chamber of an engine exhaust gas recirculation system, into a collection tank, via (i) a continuously open orifice that is positioned in a condensate collection volume indented downward into a lower wall of the cooling chamber and (ii) a condensate pipe that interconnects the orifice and collection tank. The method further comprises: venting condensate fumes from the collection tank to an exhaust stack of the engine (via a vent pipe that fluidly couples the collection tank with the exhaust stack, e.g., the vent pipe may be coupled to a top wall of the collection tank); and, via a loop seal operably connected to the bottom of the collection tank, maintaining a heel of the condensate within the collection tank and draining the condensate from the collection tank in the event that the heel exceeds a level determined by a position of the loop seal.

In another embodiment, an engine system includes two or more charge air cooling chambers 202 (e.g., two or more of the intercooler 124, the aftercooler 126, and/or the EGR cooler 130 as shown in FIG. 1). At least two of the two or more charge air cooling chambers each include respective collection volumes 204 and orifices 206 as shown in FIG. 2, for routing condensate from the charge air cooling chambers to one or more condensate pipes 208 and to one or more collection tanks 210. For example, each such charge air cooling chamber may have a respective condensate pipe 208 that runs to a respective collection tank 210, or to a common collection tank 210. In the case of a common collection tank 210, the common collection tank 210, single loop seal 212, and single vent pipe 216 support plural charge air cooling chambers for condensate removal, thereby reducing system cost and volume versus having a separate collection tank for each such equipped charge air cooling chamber.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. An apparatus comprising:
   a charge air cooling chamber, the cooling chamber having a lower wall with an orifice in the lower wall;
   a condensate pipe that is fluidly connected to drain condensate from the orifice into a collection tank;
   a vent pipe that is fluidly connected to vent fumes from an upper opening of the collection tank to an exhaust stack; and
   a loop seal that is fluidly connected to drain the condensate from a lower opening of the collection tank.

2. The apparatus of claim 1 wherein the cooling chamber is one of an intercooler chamber, an aftercooler chamber, or an EGR cooler chamber in a diesel exhaust gas recirculation system that is connected between an exhaust line and an air intake plenum of a diesel engine.

3. The apparatus of claim 1 wherein the cooling chamber has a condensate collection volume indented downward into the lower wall, and the orifice is opened from the condensate collection volume.

4. The apparatus of claim 3 wherein the cooling chamber is operably connected as part of an exhaust gas recirculation system that is connected between an exhaust line and an air intake plenum of an engine, and wherein during operation of the engine, the cooling chamber is pressurized at a pressure greater than a pressure of the exhaust stack, the collection tank is pressurized at a pressure intermediate between the cooling chamber and the exhaust stack, and the loop seal discharges to atmospheric pressure.

5. The apparatus of claim 4 wherein the cooling chamber is pressurized to at least about 6 bar.

6. The apparatus of claim 4 wherein the orifice is sized to admit a gaseous flow of no more than about 0.01% of the flow through the cooling chamber.

7. The apparatus of claim 1 wherein a discharge of the loop seal is positioned to maintain a heel of condensate within the collection tank.

8. The apparatus of claim 7 wherein the discharge of the loop seal is positioned within an enclosed space.

9. The apparatus of claim 8 wherein the enclosed space is a marine vessel engine room.

10. The apparatus of claim 1 wherein the condensate pipe is operatively connected to drain the condensate directly and continuously from the orifice into the collection tank.

11. An apparatus comprising:
an engine air intake plenum;
an EGR valve connected to admit exhaust gas from an engine exhaust line into the engine air intake plenum;
a cooling chamber fluidly coupled with the engine air intake plenum, and having an orifice in a lower wall of the cooling chamber;
a condensate pipe operatively connected to drain condensate from the orifice into a collection tank;
a vent pipe operatively connected to vent fumes from an upper opening of the collection tank to an engine exhaust stack; and
a loop seal operatively connected to drain the condensate from a lower opening of the collection tank,
wherein the cooling chamber is one of an intercooler chamber, an aftercooler chamber, or an EGR cooler chamber.

12. The apparatus of claim 11 wherein the cooling chamber has a condensate collection volume indented downward into the lower wall, and the orifice is opened from the condensate collection volume.

13. The apparatus of claim 12 wherein during operation of the engine, the cooling chamber is pressurized at a pressure greater than a pressure of the engine exhaust stack, the collection tank is pressurized at a pressure intermediate between the cooling chamber and the engine exhaust stack, and the loop seal discharges to atmospheric pressure.

14. The apparatus of claim 13 wherein the cooling chamber is pressurized to at least about 6 bar.

15. The apparatus of claim 13 wherein the orifice is sized to admit a gaseous flow of no more than about 0.01% of the flow through the cooling chamber.

16. The apparatus of claim 11 wherein a discharge of the loop seal is positioned to maintain a heel of condensate within the collection tank.

17. The apparatus of claim 16 wherein the discharge of the loop seal is positioned within an enclosed space.

18. The apparatus of claim 17 wherein the enclosed space is a marine vessel engine room.

19. The apparatus of claim 11 wherein the condensate pipe is operatively connected to drain the condensate directly and continuously from the orifice into the collection tank.

20. A method comprising:
draining condensate from a cooling chamber of an engine exhaust gas recirculation system, into a collection tank, via a continuously open orifice; and
venting condensate fumes from the collection tank to an exhaust stack of the engine.

21. The method of claim 20 further comprising:
maintaining a heel of the condensate within the collection tank; and
draining the condensate from the collection tank via a loop seal in the event that the heel exceeds a level determined by the loop seal position.

22. The method of claim 21 wherein the loop seal drains to atmosphere within an enclosed space.

* * * * *